May 11, 1971 A. LASH 3,578,539

PICTURE RECORDS

Filed July 5, 1968

3,578,539
Patented May 11, 1971

3,578,539

PICTURE RECORDS

Alec Lash, Corner House, York St., Sydney,
New South Wales, Australia

Filed July 5, 1968, Ser. No. 742,546
Claims priority, application Australia, July 19, 1967,
24,769
Int. Cl. G11b *3/84;* B29d *17/00*
U.S. Cl. 161—6 10 Claims

ABSTRACT OF THE DISCLOSURE

This application discloses the construction of a picture record being a musical or sound recording disc having a transparent playing surface superimposed over a paper disc bearing a picture, design and/or printed matter visible through the transparent playing surface and a method of manufacturing such picture records with avoidance of damage to the paper discs bearing a picture or other indicia.

Figure 1:
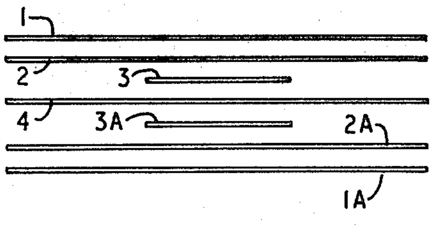

The prior art discloses novelty sound records comprising a playing surface of thin transparent layer of synthetic resin backed by cardboard or heavy weight paper and employed as spoken greeting cards or as advertising media and being of indifferent sound fidelity. Attempts have also been made to produce picture records having an acceptable high sound fidelity and involving the presence of a record core material and a capacity to undergo conventional record pressing operations. In such record pressing operations the core material softened under the influence of heat and pressure flows to fill a record die, and damages paper discs located between the core material and a superimposed transparent surface material.

The present invention, has therefore, as its primary object the provision of a musical record, bearing a picture or other insignia printed on a paper or paste board disc and having superimposed a transparent playing surface through which the underlying picture may be perceived.

A further object of the invention is to provide a musical record of the kind indicated achieved by a novel method of production and construction.

Other objects and advantages of the invention will be made apparent in the following description of a preferred embodiment which will now be given by way of exemplification.

A sound picture record in accordance with the present invention comprises a record core having on one or both sides a paper disc displaying a picture and/or other indicia and superimposed over the picture surface a layer of colourless synthetic thermoplastic resin constituting the playing surface characterised in that the said paper disc has a reinforcing disc centrally disposed on its inner surface whereby damage to the paper and spoiling of the picture in the course of record pressing is obviated.

More particularly a sound picture record in accordance with the invention comprises a tiered assembly of components as indicated above, in which the thermoplastic core forming material is applied as a compact mass between and within the area of the reinforcing discs, where the initial stress of spreading the core material, which has provide to be the factor governing tear of the paper discs, is withstood and the subsequent flow of core material in a record pressing operation to occupy the dimensions of a selected record die proceeds without damage to the paper. It is also to be appreciated that the relatively small area of reinforcement in the central region of a musical record does not adversely affect the overall appearance, desired thickness or playing qualities of a musical record.

The method of making a picture record in accordance with the present invention comprises an assembling in tiered relationship in a record press:

(a) a layer of transparent thermoplastic synthetic resin, which may be in either powder or sheet form;
(b) a paper disc bearing on its outer surface a picture and/or other indicia and provided on its inner surface a central reinforced region comprising a disc of metal foil relatively stiff paper such as linen paper or lightweight cardboard adhesively secured to the paper;
(c) a metered amount of core material adequate for a selected size of a record disc;
(d) a second reinforced paper disc with its picture surface uppermost;
(e) a second layer of transparent thermoplastic synthetic resin and subjecting the tiered assembly to heat and pressure whereby the core material flows to occupy the selected record die area and a sound track is impressed into the outermost transparent surfaces of a record.

Preferably the core material is composed of a vinyl polymer having desired flow under the conditions of heat and pressure within a record press and in which is incorporated a plasticizer and a small proportion of a lubricant such as lead stearate.

The paper discs may be of any paper of a quality capable of receiving a clear print of, for example, a photograph and any desired printed information, and the reinforcing component may be a metal foil such as a polished aluminum foil, for example that known under the trade name "Mirror Foil" or any relatively heavy-weight paper or light card board, resistant to rupture under the initial stress incurred during softening and spread of the core material.

Desirably the paper discs should be dried to remove absorbed moisture, particularly under humid atmospheric conditions. While this drying can be achieved in any desired manner best results have been achieved by holding a batch of paper in a desiccator whereby effective removal of moisture is achieved without the damage sometimes encountered with radiant heat drying procedures.

The record playing surface may be achieved from a polyvinyl chloride composition in powdered form with requisite plasticiser and lubricant components, by dusting the picture surface of the paper discs which have been pretreated with a thin tacky adhesive coating such as obtainable employing a solution of the polyvinyl chloride methyl ethyl ketone.

The adherent powder is coalesced and a clear vinyl record surface achieved under the influence of heat and pressure in the record press and being of sufficient thickness to accommodate the record playing grooves.

In one preferred embodiment the record playing surface is formed of a sheet of thermoplastic polyvinyl chloride having a thickness sufficient to receive and retain the record playing grooves. A thickness of the order of seven thoustandths of an inch has proved adequate and thicknesses between three and ten thousandths of an inch are preferred.

Further for some purposes the record playing surface may be formed over the picture prior to tiered assembly in a record press, as for example by application of a thick glaze of cellulose acetate, which receives and retains an impressed record grooving. In this case the tiered components are merely upper and lower surface treated, reinforced discs and the core material.

Adherence between a reinforcing disc and a picture-bearing paper disc may be adhesively secured and conveniently a wafer of polyvinyl chloride conforming to the dimensions of a disc, interposed between the disc and the plain paper surface in the tiered assembly of record components, adhesively unites the two, under the influence of heat and pressure in the record press.

The core material is conveniently cut from a stock sheet into suitable sized biscuits which are preheated to achieve softening before location in the record press. The softened biscuit of core material is overfolded so as to be located within the confines of the upper and lower reinforcing discs.

The invention is now described with reference to exemplary embodiments.

EXAMPLE I

A twelve inch record press was loaded with a polyvinyl sheet disc of seven thousandths of an inch thickness, a first paper disc bearing a coloured printed picture of a conductor and background orchestra with a reinforcing disc of mirror foil of about three inches diameter adhesively secured to its plain surface.

A rectangular biscuit of core material, previously heat softened and over folded was located on and within the confines of said disc.

The biscuit of core material employed in this example consists of a composition comprising Geon 429 (a product available from B.F. Goodrich and affiliates) a plasticizer, dioctyl phthallate in amounts between 5–15 percent by weight and a lubricant lead stearate in amounts between 1 and 2 percent by weight.

A second paper disc and reinforcing disc of mirror foil were located above the biscuit and a second sheet of polyvinyl chloride placed uppermost in the tiered assembly. With the press temperature at 285° F. the tiered components were united and a double sided recod of high playing quality and long wear were achieved and clearly displaying the picture through the transparent playing surface.

The same procedure was repeated save for the substitution of light card board reinforcing discs and linen paper discs with comparable results.

EXAMPLE 2

In this example, the procedures of Example I were broadly followed and the size of the picture record achieved was varied, including twelve inch and seven inch diameter records.

The polyvinyl sheet disc of seven thousandths of an inch thickness, constituting the transparent playing surface of the records obtained, was not a straight polymer but included a small proportion of a lead or zinc stearate lubricant in amounts between one and two percent by weight, to avoid some degree of sticking to a record matrix encountered when pressing straight polyvinyl sheets.

The picture-bearing paper employed was a good quality clay coated paper meeting a Mullen's strength rating of at least fifty and preferably between fifty and seventy.

In this example papers used were:

(a) Springhill coated cover, sheet dimensions of 24 x 36" and 124 lb. weight per five hundred sheets;

(b) Lousiana Coloured Cover sheet dimensions of 22½ x 35" and 91 lb. weight per five hundred sheets.

The Springhill coated cover is clay coated and was found receptive to fine screen colour printing by letterpress method or lithographic or offset techniques and for line printing. Where line printing only is required, any good quality calendered paper of substantial strength may be utilised.

The picture-bearing or otherwise printed paper was dried in a desiccator containing silica gel. Additionally the dried paper was freed of dust particles by being mounted on a suitable supporting rod, passed through the central aperture of said discs and exposed to a current of air which dislodged either settled or electrostatically attracted dust particles, so as to preserve the desired clear appearance of the picture or other indicia when viewed through the transparent playing surface of a picture record. The polyvinyl discs employed to form a transparent record playing surface are similarly freed of adherent dust.

In this Example 2, the core material was a straight polyvinyl chloride polymer modified only to the extent that there was included 1½ percent by weight of lead stearate lubricant and an equivalent amount by weight of dioctyl phthallate plasticiser.

In this example both aluminium foil, of a thickness of the order of one thousandth of an inch and stiff paper of the order of double that thickness were effectively used as reinforcing discs, with consequent avoidance of damage to the paper discs displaying a picture or other indicia for the benefit of the user of a sound record.

The tiered components of a picture record, as previously described, were subjected to heat and pressure in a conventional hydraulically operated record press, steam heated and involving pressures up to 3,000 lb. per square inch.

In a modification of the invention, a decorative musical record is achieved in which separated small pictures of a musical artist of individuals of a group are displayed beneath the transparent playing surface. Such "silhouettes" are achieved by first producing a partially hardened record core, of predetermined size. Such partially hardened record core, will not appreciably flow in the course of a record pressing operation.

The record press is loaded with a first sheet of polyvinyl chloride upon which separable "silhouettes" are placed followed by the partially hardened core material, a second array of silhouettes located thereon and an uppermost sheet of polyvinyl chloride. Upon operation of a press the desired picture record is achieved.

Figure 2:
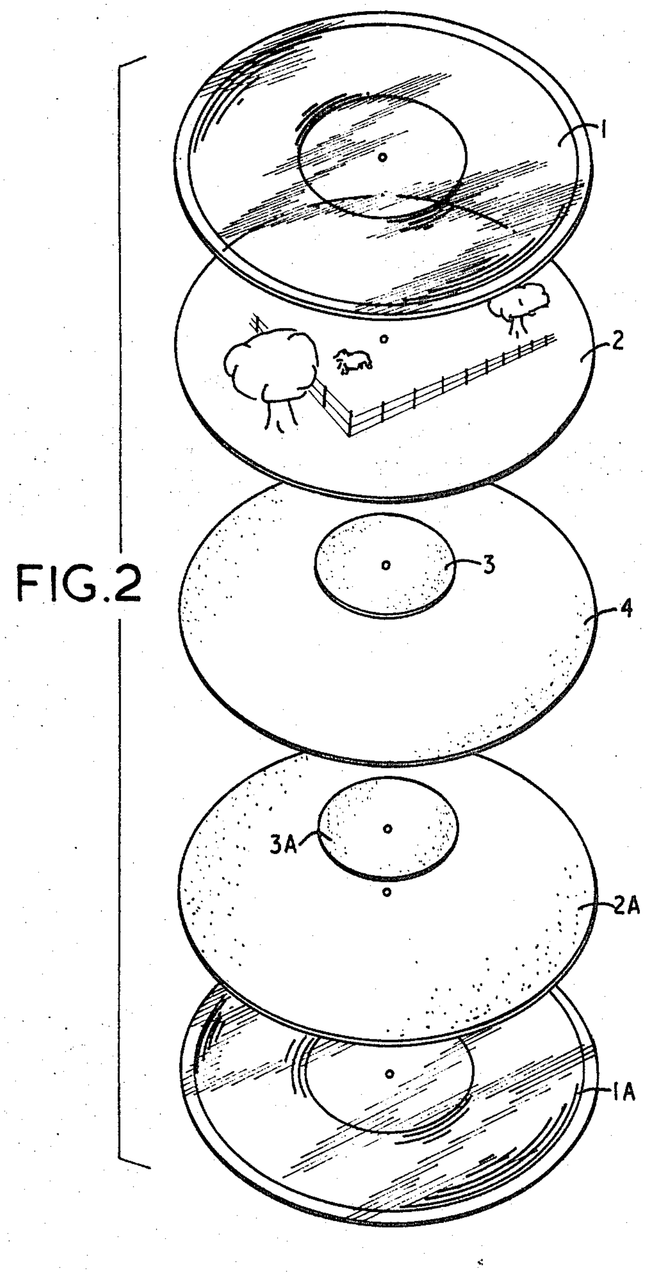

Reference is now made to the accompanying diagrammatic drawings in which:

FIG. 1 is an exploded sectional view illustrating the tiered relationship of the components of a picture record; and FIG. 2 is an exploded perspective view of the same picture record components.

In the drawings (referring to both FIGS. 1 or 2) the outer transparent playing surface 1, is superimposed upon a paper disc 2 (bearing a picture or other indicia), which paper disc overlies a reinforcing disc 3 which is adjacent the upper surface of record core 4.

The record components below the record core 4 are in reverse order to those above said core namely: reinforcing disc 3A; picture bearing paper disc 2A and transparent playing surface 1A.

Variations and modifications may be made without departing from the scope of the invention defined in the appendant claims.

What I claim is:

1. A sound-picture record, comprising a core disc, a layer of transparent thermoplastic resin material covering at least one side surface of said core disc and having playing grooves therein, an indicia bearing paper disc interposed between said core disc and resin layer, and a reinforcing disc interposed between said core disc and said paper disc centrally thereof whereby damage to said indicia bearing paper disc and the indicia thereon in the record press is avoided.

2. A sound-picture record as set forth in claim 1, in which said core disc essentially comprises a polyvinyl chloride polymer material containing a dioctyl phthallate plasticizer and one to two percent by weight of lead stearate as a lubricant.

3. A sound-picture record as set forth in claim 2, in which said dioctyl phthallate plasticizer is present in an amount of five to fifteen percent by weight.

4. A sound-picture record as set forth in claim 1, in which said core disc essentially comprises a polyvinyl chloride polymer material containing a dioctyl phthallate plasticizer and one to two percent by weight of zinc stearate as a lubricant.

5. A sound-picture record as set forth in claim 1, in which said reinforcing disc is a metal foil.

6. A sound-picture record as set forth in claim 1, in which said reinforcing disc comprises a paper material and is relatively stiff.

7. A sound-picture record as set forth in claim 1, in which said transparnt thermoplastic resin matrial comprises a sheet of polyvinyl chloride containing one to two percent by weight of lead stearate.

8. A method of producing a sound-picture record, comprising the steps of assembling in tiered relationship—

(a) a first layer of a transparent thermoplastic resin material,
(b) a first indicia bearing paper disc,
(c) a first relatively stiff reinforcing disc adhesively secured to said first paper disc centrally thereof,
(d) a core material in an amount adequate for the selected size of the record,
(e) a second relatively stiff reinforcing disc,
(f) a second indicia bearing paper disc having said second reinforcing disc adhesively secured thereto centrally of said second indicia bearing paper disc, and
(g) a second layer of a transparent thermoplastic resin material, subjecting the tiered assembly to heat and pressure in a record press thereby causing said core material to flow to occupy the record die area, and impressing sound tracks into the outwardly surfaces of said first and second layers of transparent thermoplastic resin material.

9. The method as set forth in claim 8, in which said first and second reinforcing discs each comprises a metal foil.

10. The method as set forth in claim 8, in which said first and second reinforcing discs each comprises a paper material.

References Cited

UNITED STATES PATENTS

| | | | |
|---|---|---|---|
| 2,353,369 | 7/1944 | Sears | 40—340X |
| 2,528,611 | 11/1950 | Saffady | 264—107X |
| 3,050,433 | 8/1962 | Sakamoto | 161—42X |
| 3,247,298 | 4/1966 | Utiger | 264—107 |

JOHN T. GOOLKASIAN, Primary Examiner

R. A. KILLWORTH, Assistant Examiner

U.S. Cl. X.R.

40—340; 156—245; 161—5, 42; 264—107